United States Patent [19]
Bird et al.

[11] Patent Number: 6,108,438
[45] Date of Patent: Aug. 22, 2000

[54] FINGERPRINT SENSING DEVICES AND SYSTEMS INCORPORATING SUCH

[75] Inventors: Neil C. Bird, Horley; Gerard F. Harkin, Brighton, both of United Kingdom

[73] Assignee: U.S. Philips Corporation, New York, N.Y.

[21] Appl. No.: 09/063,847

[22] Filed: Apr. 21, 1998

[30] Foreign Application Priority Data

Apr. 29, 1997 [GB] United Kingdom ............ 9708559

[51] Int. Cl.[7] ............... G06K 9/00; G06K 11/00
[52] U.S. Cl. ........................... 382/124; 250/556
[58] Field of Search ..................... 382/124, 125, 382/126, 127, 100, 133, 115; 250/556, 208.1, 221, 557

[56] References Cited

U.S. PATENT DOCUMENTS

| | | | |
|---|---|---|---|
| 5,325,442 | 6/1994 | Knapp | 382/125 |
| 5,446,290 | 8/1995 | Fujieda et al. | 250/556 |
| 5,635,723 | 6/1997 | Fujieda et al. | 382/127 |

FOREIGN PATENT DOCUMENTS

| | | | |
|---|---|---|---|
| 0397244A2 | 11/1990 | European Pat. Off. | G06K 11/16 |
| 0457398A2 | 11/1991 | European Pat. Off. | G11C 27/02 |
| 974074A1 | 11/1997 | WIPO | G01B 7/004 |

*Primary Examiner*—Jose L. Couso
*Assistant Examiner*—Duy M. Dang
*Attorney, Agent, or Firm*—Steven R. Biren

[57] ABSTRACT

A fingerprint sensing device comprises an array of sense elements (12) which each include a sense electrode (33), providing in combination with an overlying fingerprint part a capacitance (35), and first and second diode devices (30, 31) connected respectively between the sense electrode and associated ones (18, 20) of first and second sets (e.g. row and column) address conductors. An address circuit (22, 24) connected to the address conductors biases the diode devices in a respective address period such that a potential is applied via the first address conductor and the first diode device to the sense electrode and thereafter stored charge, indicative of the capacitance, is transferred via the second diode device to the second address conductor. The device offers fast, reliable, scanning and can conveniently be implemented using thin film technology for low cost and compactness.

20 Claims, 5 Drawing Sheets

FINGERPRINT SENSING DEVICES AND SYSTEMS INCORPORATING SUCH

BACKGROUND OF THE INVENTION

The present invention relates to a fingerprint sensing device comprising an array of capacitive sense elements which each include a sense electrode for providing, in combination with an individual portion of an overlying finger, a capacitance, and addressing means connected to the sense elements through first and second sets of address conductors for addressing the sense elements and providing outputs indicative of the capacitances of the sense elements. The invention relates also to a fingerprint recognition system incorporating such a device.

In a known fingerprint sensing device of the above kind, as described in U.S. Pat. No. 5,325,442, the sense elements are arranged in rows and columns and connected to a peripheral addressing circuit via sets of row and column address conductors. Each sense element includes a thin film transistor, TFT, whose drain electrode is connected to the sense electrode and whose gate and source electrode are connected to a row and a column address conductor respectively. All sense elements in a respective row share the same row conductor while all sense elements in a respective column share the same column address conductor. The sense electrodes are covered with dielectric material and together with individual fingerprint portions placed over the dielectric material constitute capacitors. A gating (selection) signal is applied to each row conductor by the addressing circuit in a respective row address period to turn on the TFTs of the sense elements of each row in sequence so that a predetermined potential present on the column address conductors is applied to the sense electrodes to charge the capacitors. The individual capacitances of these capacitors, dependent on the spacing of the fingerprint portions from the sense electrodes as determined by the presence of a ridge of a trough of the fingerprint, are measured by sensing the current which flows in the column conductors during their charging. At the end of a row address period, the TFTs at the row turn off and the next row of sense elements is addressed by the application of a gating signal to the following row conductor. Each row of sense elements is addressed in this manner in turn and the variation in sensed capacitances produced over the array of sense elements by a fingerprint ridge pattern provides an electronic image or representation of the three dimensional form of the fingerprint surface. For consecutive readings of capacitance images, in successive field scan operations, the charge on the sense electrodes is removed, or at least reduced, before the sense elements are addressed again. This is achieved either by incorporating a resistor in each sense element which is connected between the sense electrode and ground, by changing the predetermined voltage applied to column conductors in successive read cycles, or by arranging the addressing circuit to include an intermediate reset cycle between successive read cycles. The provision of a resistor, for example using a doped semiconductor material, is difficult and complicates fabrication of the sense element array, while the other two approaches cause complications to the addressing circuit.

There is currently much interest in fingerprint sensing devices and the use of thin film, large area, technology enables compact devices to be produced at a relatively low-cost compared with conventional optical sensing devices. Although the device of U.S. Pat. No. 5,325,442 has an advantage in this respect, there is a need to reduce the cost still further while maintaining, or improving, performance.

SUMMARY OF THE INVENTION

It is an object of the present invention to provide an improved fingerprint sensing device.

According to one aspect of the present invention, a fingerprint sensing device of the kind described in the opening paragraph is characterised in that each sense element has a first diode device connected between an address conductor of the first set and the sense electrode through which an electrical potential supplied to that address conductor by the addressing means is applied to the sense electrode and a second diode device connected between the sense electrode and an address conductor of the second set through which a charge stored via the capacitance of the sense element is fed to the address conductor of the second set. By virtue particularly of the use of diode devices and the charging of the sense elements capacitances via the first set of address conductors, the invention offers a number of advantages.

In thin film technology, the diode devices can comprise pin diodes. Such diodes are generally simpler to fabricate than TFTs as fewer mask steps are required and therefore the fingerprint sensing device can be produced at lower cost, and possibly more reliably, than one using TFTs. Although two diodes are required for each sense element this does not unduly complicate fabrication of the array. The use of such diodes also means that lower drive voltages would be required, thereby enabling low cost CMOS drive circuits to be employed and resulting in lower power consumption. Moreover, there will be less capacitive couplings from the address conductors of the first set to the address conductors of the second set due to the lowering of the drive voltage swings and, importantly, lower leakage currents present than is the case when TFTs are used. Other forms of diode devices, such as Schottky diodes or pn diodes could be used. It is envisaged also that diode connected TFTs could perhaps be used as the diode devices although then the advantages would be fewer.

Operation of the two diodes to charge up the sense element's capacitance and to read-out the stored charge respectively can conveniently be accomplished by the addressing means biassing the diode devices in appropriate manner.

The addressing means may be arranged to control the biassing of the two diode devices, of a sense element, via its associated first and second address conductors, such that they are rendered conductive in succession. The addressing means can be arranged in a relatively simple and convenient manner to apply control signals to the first and second address conductors associated with a sensing element appropriately to operate the two diode devices in succession in an address period for the sense element so that, firstly, the first diode device is forward biassed, resulting in a potential, determined by the voltage level on the address conductor of the first set, being applied to the sense electrode and charging the capacitor, with the amount of charge stored dependent on whether a fingerprint ridge or a valley overlies the sense electrode at the time, and thereafter the second diode device is forward biassed so that charge stored on the sense electrode is transferred, via that diode, to the address conductor of the second set where it can be detected. Preferably, however, the addressing means is arranged to render the first and second diode devices of a sense element conductive at the same time in a first part of an address period for the sense element so as to set the voltage at the sense electrode at a predetermined level, and to turn off the first diode device in a latter part of the address period so that charge stored on the sense electrode is transferred to the address conductor of the second set via the second diode device.

Fast and reliable read-outs from the array are possible with both these operating schemes. There is no need to remove the charge stored on a sense element capacitance in a separate operation, as in the known device. The control signals required for operating the sense elements can be of very simple form, and an uncomplicated drive circuit, capable of fast operation, can be used. The latter scheme offers the possibility of improved performance and simpler implementation.

Preferably, the sets of first and second address conductors comprise sets of row and column conductors respectively and the sense elements are arranged in rows and columns with the first diode devices of each sense element in a row being connected to a respective row conductor and the second diode devices of each sense element in a column being connected to a respective column conductor. In this case, the addressing means may conveniently be arranged to apply in respective row address periods selection address signals to each of the row conductors in sequence so as to select the rows of sense elements in turn, and to apply control signals to the column conductors during each row address period so as to bias appropriately the diode devices of the sense elements in the selected row.

Although charge stored in the sense element capacitances is transferred to the column conductors upon operation of the second diode devices for readout, it is possible that a small amount of charge might remain after read-out because the sense element capacitances may not be allowed to completely discharge during the read-out period as a consequence of the non-linear forward resistance of the diodes. Such residual charge could lead to a vertical cross-talk problem when reading-out subsequent sense elements in the same column. Preferably, therefore, the addressing means is arranged to reset the sense elements in a latter part of their address period by applying a reset bias signal to the column conductors to completely discharge the sense elements' capacitances after read-out.

In EP-A-0397244, there is described a touch input sensing array system for use with a stylus or finger which includes row and column array of touch sensor elements, together with sets of row and column address conductors formed by thin film device technology on an insulating substrate. With appropriately selected sensor element size and pitch the array could be utilised for fingerprint sensing purposes. In this system, however, each sensor element comprises a fixed capacitor, a switch device in the form of a TFT or diode through whose operation a potential is supplied to the capacitor to charge up the capacitor at regular intervals, and a contact pad which, when touched by a finger or stylus discharges the capacitor, such discharge being detected when the capacitor is charged up again in a subsequent field period so as to provide an indication of sensor elements touched in the preceding field.

The sensing element array could be fabricated using integrated circuit single crystal semiconductor technology, using for example a silicon wafer. Preferably, however, it is fabricated using thin film technology similar to that used for the production of other active matrix arrays such as those used in LCDs. This involves the deposition and definition by photolithographic patterning processes of a number of layers on a common insulating substrate. The diode devices, preferably comprising pin structures, may be formed from amorphous or polycrystalline silicon, deposited on an insulating substrate of glass or plastics material and the sets of address conductors may be formed from deposited conductive material. Such technology conveniently allows a single, large area, substrate to be used upon which a large number of arrays are fabricated simultaneously and which can then subsequently be cut into portions, each portion comprising an individual sensing element array. This approach results in further, significant reduction in manufacturing expense.

According to another aspect of the present invention there is provided a fingerprint recognition system comprising a sensing device in accordance with the one aspect of the invention, means responsive to the outputs from the addressing means of the device to provide characteristical data of a sensed fingerprint, and means for comparing said characteristical data with stored characteristical data for one or more fingerprints.

BRIEF DESCRIPTION OF THE DRAWINGS

Embodiments of fingerprint sensing devices, and a fingerprint recognition system incorporating such, in accordance with the invention will now be described, by way of example, with reference to the accompanying drawings, in which.

It is to be understood that the Figures are merely schematic and are not drawn to scale. Certain dimensions may have been exaggerated while others have been reduced. The same reference numbers are used throughout the Figures to indicate the same, or similar, parts.

DESCRIPTION OF THE PREFERRED EMBODIMENTS

Figure 1:
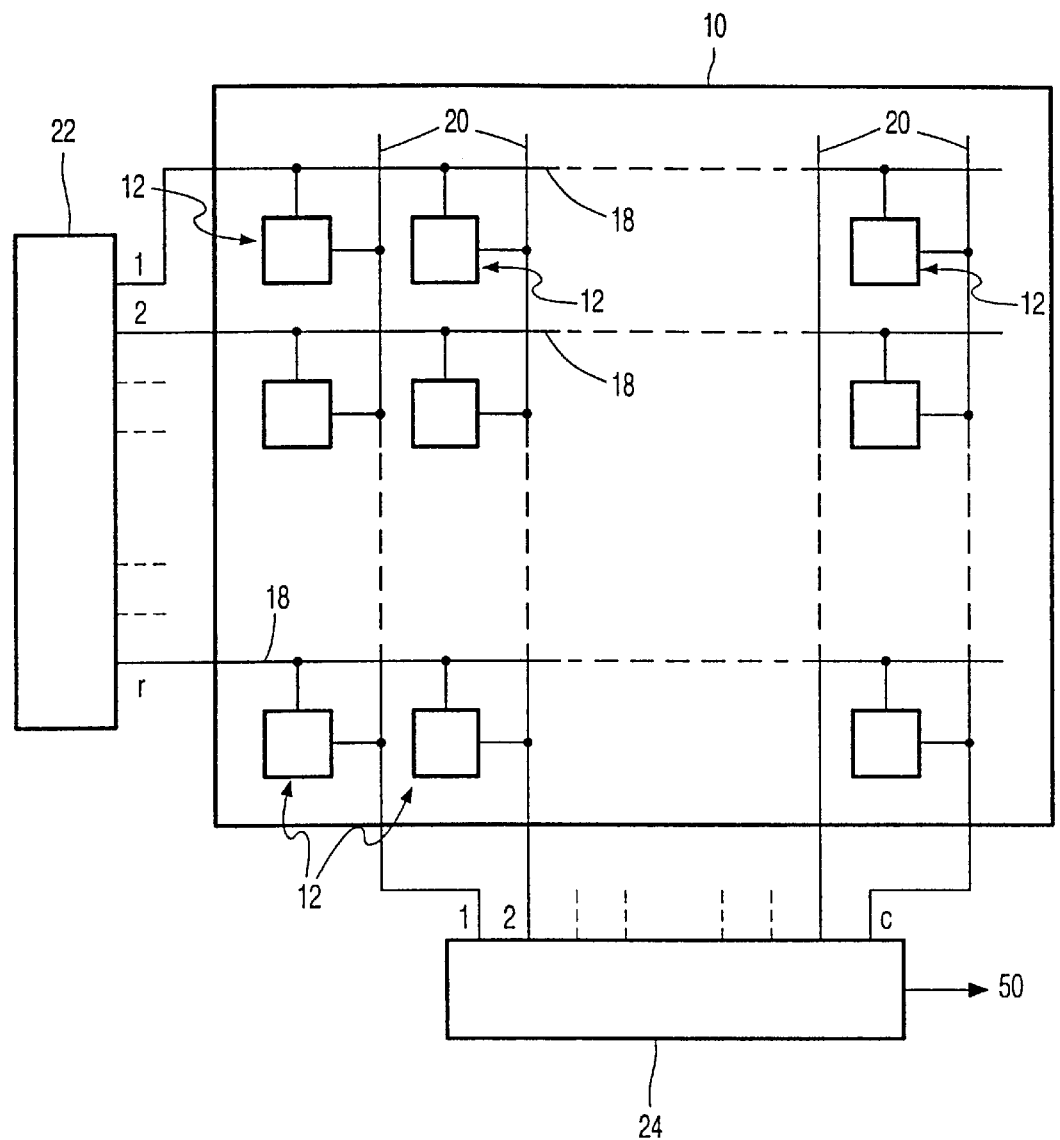
FIG. 1 is a simplified schematic diagram of an embodiment of the sensing device showing an array of sense elements together with associated addressing circuitry.

Referring to FIG. 1, the fingerprint sensing device comprises an active matrix addressed sensing pad 10 having an X-Y array of regularly-spaced sense elements 12, consisting of r rows (1 to r) each with c sense elements, which are operable to scan a fingerprint. Only a few rows and columns are shown for simplicity. In practice there may be around 512 rows and 512 columns of sense elements occupying an area of approximately 2.5 cms by 2.5 cms.

The array of sense elements 12 is addressed by addressing means comprising a row drive circuit 22 and a sense circuit 24 via sets of regularly-spaced row (selection) address conductors 18 and column (sensing) address conductors 20 connected at their ends the circuits 22 and 24 respectively with individual sense elements being located at respective intersections of the two sets of conductors. All sense elements in the same row are connected to a respective one of row conductors 18 and all sense elements in the same column are connected to a respective, common, column conductor 20.

Figure 2:
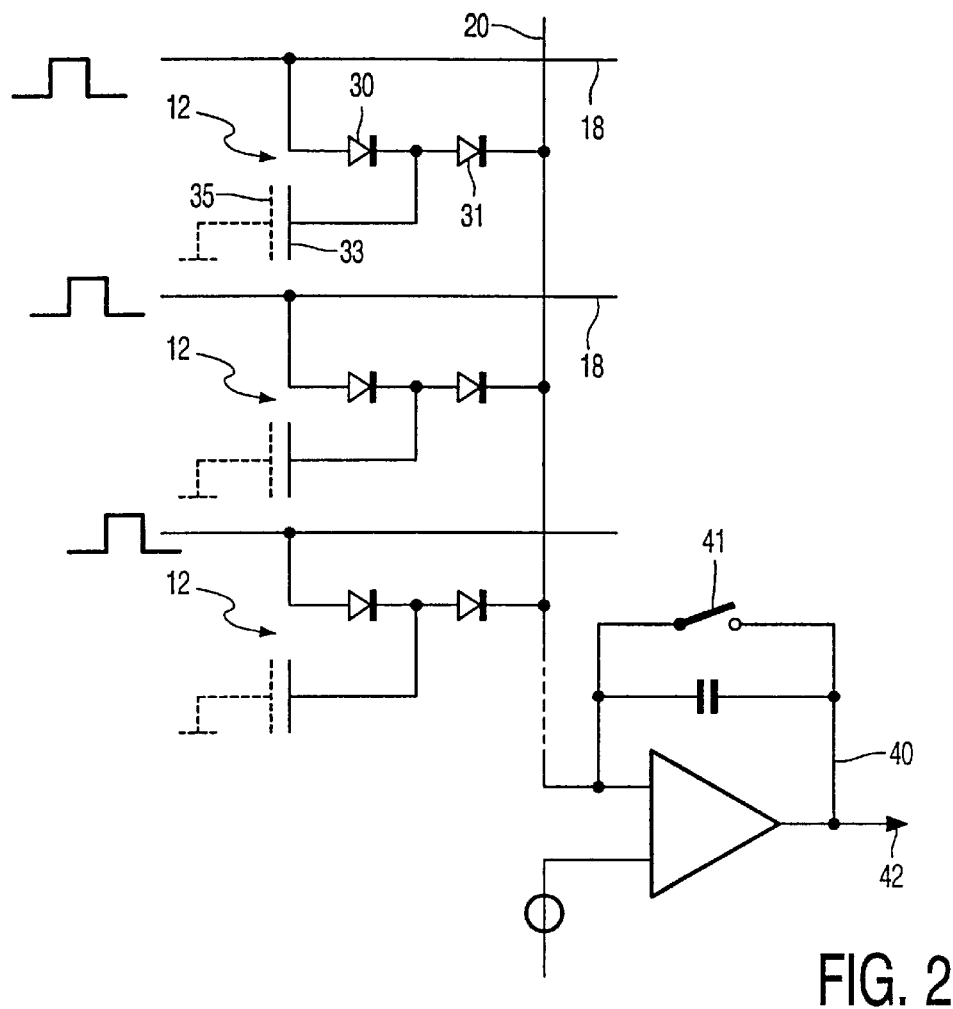
FIG. 2 shows schematically the equivalent circuit of a typical group of sense elements in one column of the array of the device of FIG. 1.

FIG. 2 illustrates the circuit configuration of a typical group of three successive sense elements from the same column. Each sense element 12 consists of a pair of two-terminal, unidirectional, non-linear switching devices in the form of diodes 30 and 31 and a sense electrode 33. The first diode 30 is connected between the row conductor 18 and the sense electrode 33 and the second diode 31 is connected between the sense electrode 33 and the column conductor 20. As shown in FIG. 2, the diodes 30 and 31 are effectively connected front to back in series between the associated row and column conductors 18 and 20 with the sense electrode connected to the node between the two diodes. The sense elements 12 and address conductors 18 and 20 of the pad 10 are fabricated using standard thin film technology as used, for example, in other active matrix array applications such as active matrix LC display devices and as such it is not thought necessary to describe here the manner of fabrication in detail. Briefly, it involves the deposition and patterning, by photolithographic definition processes, of a number of layers on an insulating substrate. The electrodes 33 and sets of address conductors 18 and 20 can be formed from deposited metal and the diodes 30 and 31 are preferably formed as amorphous silicon or polycrystalline silicon p-i-n structures. The insulating substrate may be of glass, polymer, or quartz.

Figure 3:
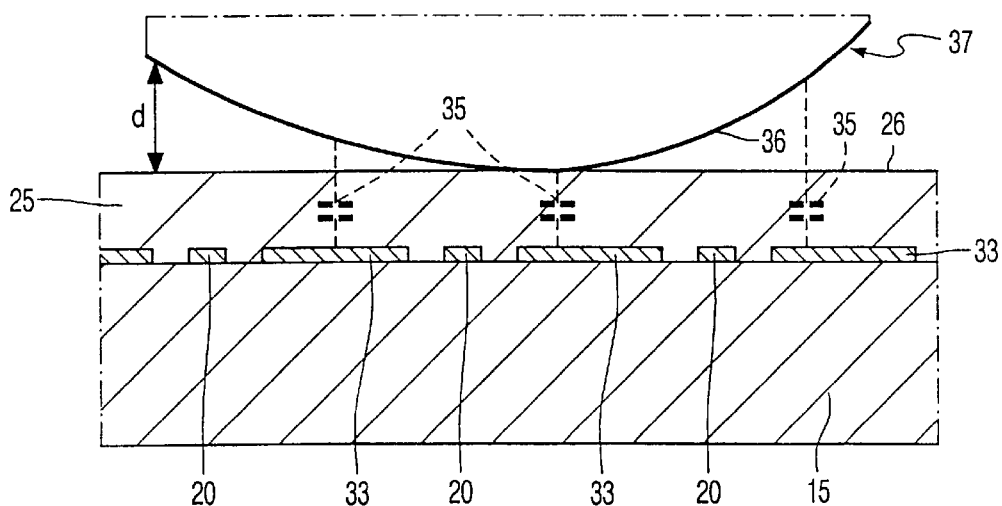
FIG. 3 is a schematic cross-sectional view through a part of the sensing device illustrating the manner of its operation.

An example of one form of array construction is shown schematically and simplified in FIG. 3 which is a cross-section through a representative part of the pad 10 comprising three complete sense electrodes 33. The diodes 30 and 31, not visible in this section, are formed on an insulating substrate 15 from a deposited layer of amorphous or polycrystalline silicon material, suitably doped to provide the p-i-n structure, preferably with the n layer being closest to the substrate. The array of sense electrodes 33, comprising regularly spaced, and equally sized, rectangular conductive pads, and the set of address conductors 20 extending therebetween are defined from a common deposited metal layer. Extensions of the electrodes 33 respectively form bottom contacts for the diodes. Insulating material is provided between the conductors 18 and 20 at the regions where they cross-over and around the diodes 30 and 31. The set of row conductors 18, not visible in FIG. 3, is formed from a deposited metal layer with each row conductor extending between adjacent rows of sense electrodes 33 and having integral extensions spaced along its length, which serve as a top contact for the diode 30. Portions of this metal layer are also used to form the top contact of the diode 31 and its connection to the sense electrode 33 and bottom contact of the diode 30. To complete the structure a dielectric film 25, for example of silicon nitride or polyimide, is deposited completely over the structure on the substrate 30 to provide a continuous sensing surface 26 spaced a predetermined distance from, and substantially parallel to, the substrate surface.

The physical dimensions and mutual spacings of the sense electrodes 33, and consequently the sense elements, are chosen in accordance with the resolution characteristics required for fingerprint sensing. By way of example, the sense electrodes may have a pitch of around 50 to 100 micrometers in both the row and column directions. The thickness of the insulating film 25 is selected taking into account the value of the relative permittivity of the insulating material and the area of the sense electrode. For example, a relative permittivity of approximately 6, and a film thickness around 0.1 micrometers may be used with a sense electrode around 50×50 micrometers.

In operation of this sensing device, a finger whose print is to be scanned is placed on the sensing surface 26. Actual, or close, physical contact with the surface 26 then occurs at the ridges of the fingerprint, as illustrated in FIG. 3 where one ridge 36 of part of the finger surface 37 is depicted. Troughs in the fingerprint profile are spaced from the surface 26 by a considerably greater distance. The ridged finger surface is therefore spaced from the array of electrodes 33 by a minimum distance determined by the thickness of the thin dielectric film 25. Each sense electrode 33 and the respective overlying portion of the finger surface form opposing plates of a capacitor 35, as depicted by dotted lines in FIG. 3, with the upper plate being constituted by the finger surface portion, and effectively at an ac ground potential, and with the film 25, together with any air gap present between a local finger surface portion and the sensing surface 26, providing the capacitor dielectric. The capacitances of these individual capacitors vary as a function of the spacing, d, between the finger surface and the sensing surface 26, with larger capacitances occurring where the fingerprint ridges are in contact with surface 26. The variation in capacitances produced over the array of sense elements 12 of the pad 10 by a fingerprint ridge pattern thus constitutes in effect an electronic "image" of the three dimensional form of the fingerprint surface. These capacitances are sensed and an output provided indicative of the variation, and hence the three-dimensional profile of the fingerprint.

The diodes in each element are used to charge and discharge the capacitance formed between the finger portion and the sense electrode. By measuring the amount of charge supplied to the capacitance the value of the finger capacitance can be found.

Each sense element in the array is addressed through its associated row, selection, and column, sensing, conductors 18 and 20. The row drive circuit 22 provides a selection signal in the form of a voltage pulse to each row address conductor 18, one at a time in turn, and so each row conductor, starting at row 1, receives a selection signal in sequence, as depicted schematically in FIG. 2. Each column conductor 20 is connected at its end to a charge-sensitive amplifier 40 in the sense circuit 24, one such amplifier being shown in FIG. 2. The non-inverting input of each amplifier 40 is connected to a pulse generating circuit within the sense circuit 24 which allows the amplifier to drive the associated column conductor 20 to potential levels other than the virtual earth voltage.

The potentials applied to a row conductor 18 and a column conductor 20 by the circuits 22 and 24 are arranged to bias the diodes 30 and 31 of the sense element associated with the two address conductors appropriately to perform their required functions of charge inputting and charge read-out within a respective row address period. Various drive schemes can be used for this purpose.

One drive scheme will now be described with reference to FIG. 4 which illustrates examples of the waveforms applied to two typical, successive, row conductors, n and n+1, and a column conductor, C, and the relative timings for the control signals employed for this purpose. Also shown, at S, is the relative timing of the operation of the switch 41 controlling the mode of the charge-sensitive amplifier 40, 0 and 1 denoting open and closed respectively.

Row address periods are indicated at Tr. In this scheme, the two diodes of a sense element are biased by appropriate drive signals applied to the associated address conductors so as to be rendered conductive in succession during a respective address period, the diode 30 being rendered conductive first in order to charge the capacitance and thereafter the diode 31 being rendered conductive to read out the charge onto the column conductor.

During an initial, charge input, part Ta of the row address period Tr for the first row, n, the diode 31 of the sense element 12 is reversed biased by the relatively high positive voltage signal +Vh applied to the column conductor 20 via the amplifier 40. The amplifier switch 41 is closed during this part. A positive voltage pulse signal +Vs is applied to the row conductor 18 by the row driver circuit 22 which forward biases the diode 30 and the capacitance 35 charges up, according to the spacing of the individual fingerprint portion overlying the sense electrode 33. The charge stored on the capacitance is, therefore, representative of this spacing and indicative of whether the overlying fingerprint portion is a ridge or trough. At the end of the charge input period Ta the row conductor voltage goes negative, −Vo, to reverse bias and turn off the diode 30. Shortly after this, a read-out period, To, commences with the amplifier switch 41 opening so that the amplifier 40 is configured as an integrator. During this period, a small negative voltage −Vm is applied to the positive input of the amplifier 40 which forces the column conductor potential to −Vm. This potential forward biases the diode 31 and so the capacitor 35 discharges into the feedback capacitor of the amplifier 40 via the column conductor 20. During the latter part of this period To the column conductor potential is once again returned to +Vh, followed shortly by the amplifier switch 41 again being closed.

Due to the non-linear forward resistance of the diode 31, the sensing element capacitance may not always completely finish discharging during the read-out period. If this happens, then when the succeeding sense element in the same column is being addressed in the next row address period the −Vm potential applied to the column conductor in the read-out period for the next row of sense elements could slightly forward bias the diode 31 in the preceding sense element so that the amplifier 40 not only detects charge from the intended sense element but also a residual charging current from the sense element in the preceding row. The effect of this vertical cross-talk can be a downward smearing of the electronic fingerprint image produced. Because of this possibility, each row address period Tr in this particular example further includes towards its end a reset period, Td, which follows the read-out period To. During this reset period the column conductor 20 is taken to a voltage $-V_L$ lower than the voltage Vm used for read-out which further discharges the capacitor 35 so that the diode 31 cannot be (partially) turned on when subsequent sensing elements in the same column are being read out.

All the sense elements 12 in the same row are addressed simultaneously in this manner in a respective row address period with their individual read outs being produced by the amplifiers 40 associated with their respective column conductors 20. Following this, the next row of sense elements is addressed in a subsequent row address period Tr (n+1) and so on for all the rows of sensing elements in the array. Thus, the fingerprint is scanned by the sequential addressing of the rows and a complete image of the capacitor characteristics is built up following the addressing of all rows in one complete field period. Typically, each row address period, i.e. a line time, may be around 100 to 200 micro-seconds in duration, enabling around 10 to 20 fields per second for 500 rows. The individual, parallel, read-outs generated at the outputs 42 of the amplifiers 40 are converted in the circuit 24 to serial format and supplied to an output 50, for example by means of a switch arrangement controlled by a shift register as described in U.S. Pat. No. 5,325,442, for each row in turn.

Several readings of the capacitance image of a fingerprint can be taken in rapid successive over successive field periods, allowing an averaging operation to be performed for improving accuracy.

In this particular scheme, then because the diodes 30 and 31 have a non-linear forward resistance incomplete charging and discharging of the capacitance 35 during the charge input and read-out periods may result so that the output voltages from the charge sensitive amplifiers 40 might not be directly proportional to the finger capacitance. The effect is exacerbated by the fact that the capacitance 35 is not a constant, but a variable. The output from the charge sensitive amplifier 40 is a function of the capacitance 35 and the difference between the voltages across it at the start and end of the read-out period and so the amount of charge detected by the charge-sensitive amplifier 40 may not be proportional to the capacitance 35. The non-linearity can be improved, if required, by reducing the ratio of the maximum and minimum possible capacitance values, which can be achieved in simple manner by adding a fixed value capacitor in parallel with the capacitance 35.

Figure 4:
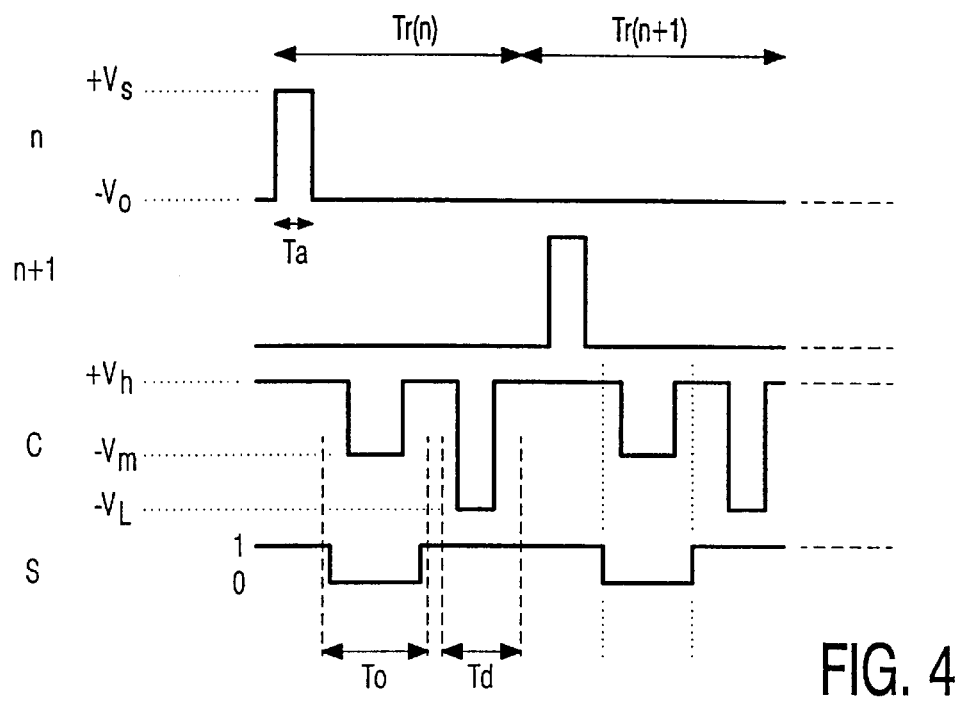
FIG. 4 illustrates typical drive waveforms used in a first drive scheme for operating the device.
Figure 5:
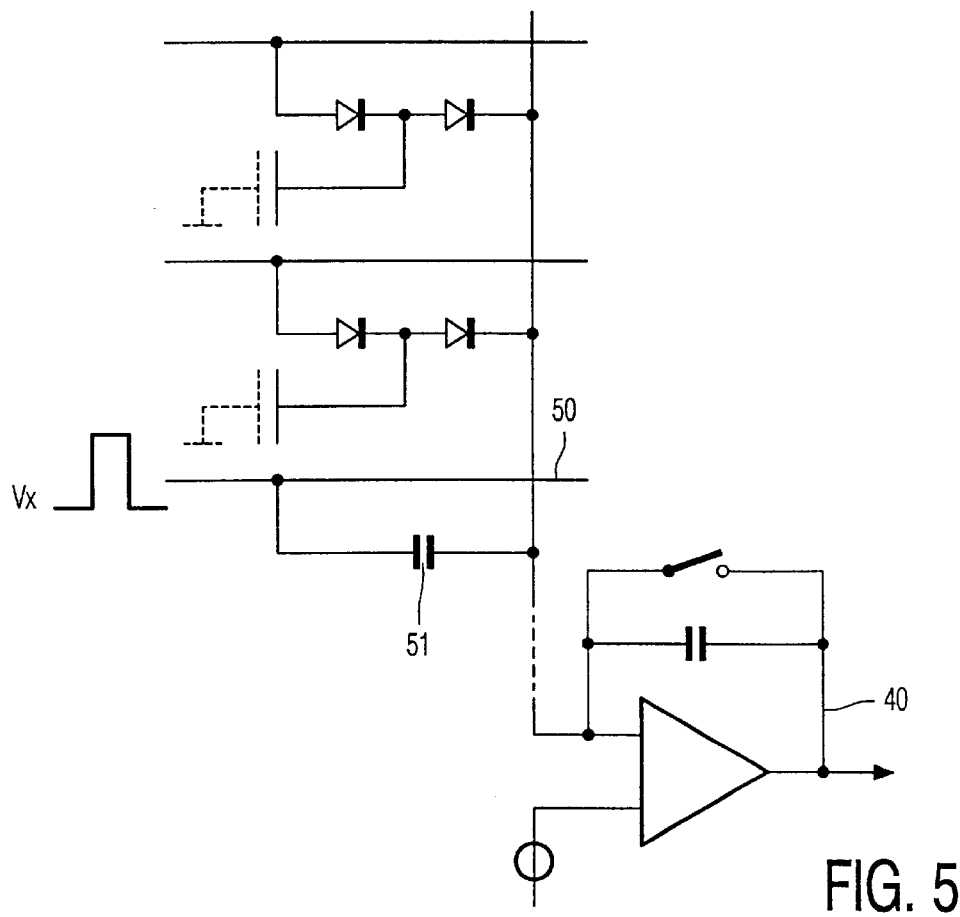
FIG. 5 illustrates a modification to the sense element array.

As is apparent from FIG. 4, the timing of the operation of the amplifier's reset switch 41 is such that it opens before the start of the read-out pulse Vm and closes after the end of that pulse which ensures that all of the charge from the sense element capacitance is integrated, particularly as most of the current flowing through the capacitance occurs immediately after the leading edge of the Vm pulse when the forward bias on the diode 31 is at its highest. However, this timing means that capacitively-coupled charge from the edge of the Vm pulse is also integrated and in practice the magnitude of the capacitively-coupled charge pulses may be large enough to saturate the amplifier because the whole column is being pulsed and the capacitance from all sense elements in the column is contributing to the capacitively-coupled charge. As shown in FIG. 5, a simple solution to this problem, if needed, is to add a supplementary row conductor, 50, to the array with a compensation capacitor 51 connected at the intersection between this row conductor and each column conductor 20. Cancellation of the coupled charge is achieved by applying a positive compensation pulse, Vx, with the same timing as the Vm pulse in each row address period to the extra row with the value of the compensation capacitor 51 and the height of the compensation pulse Vx being designed to cancel the charge that would be coupled into the charge-sensitive amplifier 40 by the Vm pulse being applied to the column.

Figure 6:
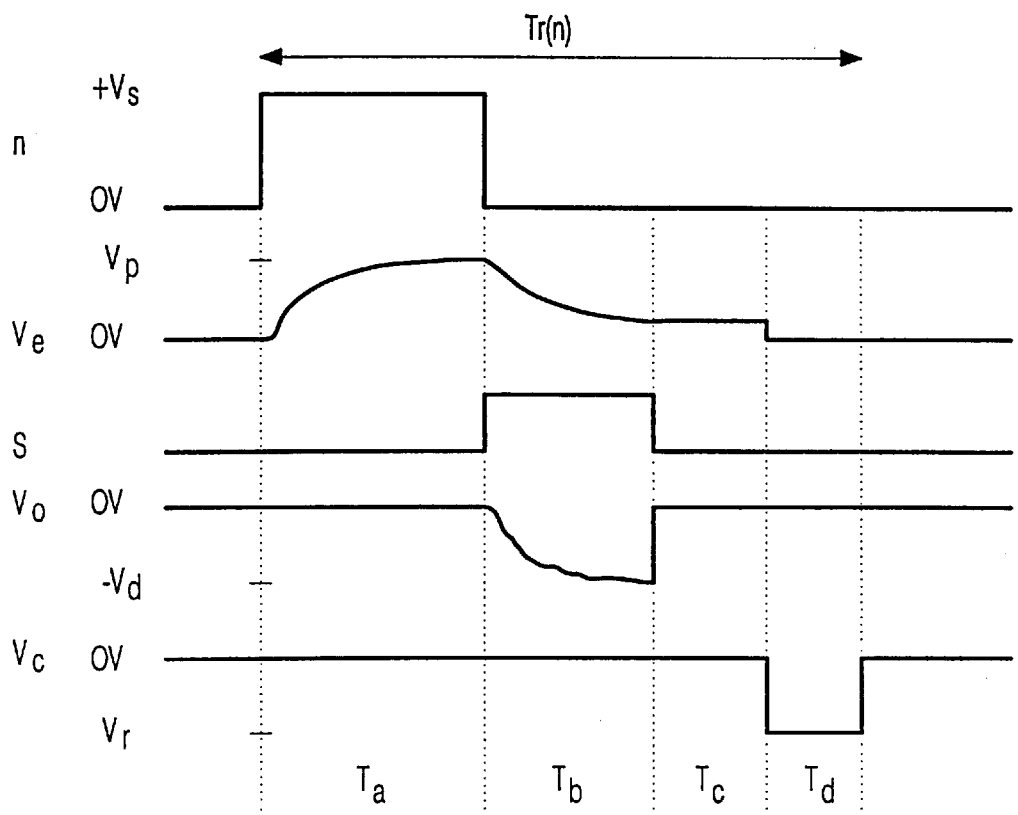
FIG. 6 illustrates typical drive waveforms in a second drive scheme for operating the device.

A second, and preferred, manner of operating the array is illustrated in FIG. 6 which shows schematically the waveform of a signal applied to a typical row conductor, n, by the row drive circuit 22, the voltage, Ve, at the junction between the two diodes 30 and 31 of a sense element, connected to that row conductor, and thus at the sense electrode 33, the operation, S, of the amplifier feed back switch 41, an example output voltage, Vo, from the amplifier 40, and the column conductor waveform Vc, including a reset signal, component Vr, applied via the positive terminal of the amplifier 40, all during a row address period Tr for a respective row of sense elements. The row of sense elements is selected, as before, by the row drive circuit 22 applying a positive pulse signal +Vs, for example around 6 volts, to the row conductor 18, in an initial part, Ta, of the row address period Tr. This turns both diodes 30 and 31 on which then act as a voltage divider causing the voltage, Ve, on the sense electrode 33 to rise to a predetermined level, Vp, for example around 3 volts, and charging of the capacitance 35. During this period Ta, the amplifier switch 41 is closed. The falling edge of the pulse signal +Vs turns off the diode 30 and the capacitor 35 is then almost immediately discharged in the subsequent reading period Tb with the charge stored then passing onto the column conductor 20 through the diode 31 which remains on. In this period Tb the amplifier switch 41 is open and the charge supplied to the column conductor is integrated and a voltage output for example as shown at Vo is obtained from the amplifier 40. At the end of period Tb, the amplifier feedback switch 41 is again closed. During the next short period Tc following the closure of the switch 41 the voltage across the diode 31 continues to decrease but a small residual voltage, for example around 1 volt, could remain on the sense electrode 33, as shown in the waveform Ve, due to the fact that there is a voltage drop across the diode when it is on, and cause the diode 31 to stay on. To ensure, therefore, that the diode 31, and the corresponding diodes in the other sense elements in that row, are turned off before the next row is addressed and prevent a leakage current flowing in the column conductor when addressing the subsequent row, the voltage on the column conductor 20, which for the preceding periods Ta, Tb and Tc is at virtual earth, is in the final part, Td, of the row address period pulsed negatively by applying a negative voltage pulse signal Vr, e.g. −1 volt, to the positive terminal of the amplifier 40 so as to reverse bias the diode 31. As a result of this the residual voltage on the sense electrode 33 is returned to zero. Following the period Tp, therefore, both diodes 30 and 31 are off and the capacitance of the sense element is isolated from the column conductor 20. Each row of sense elements is addressed in this manner in turn in respective row address periods as previously to scan the fingerprint in one field.

With this addressing scheme, therefore, the two series-connected diodes 30 and 31 are arranged to act as a potential divider which sets the voltage of the capacitance 35 at a predetermined level, corresponding to the voltage level at the mid-point of this divider to which the sense electrode 33 is connected. This results in rapid charging of the capacitance. Importantly, the setting of the sense element's capacitance to a definite, fixed, voltage eliminates the need for any compensation capacitors and parallel linearising capacitors.

In both the above described schemes the voltage pulses applied to the column conductors 20 could be provided by a separate circuit connected to the column conductors, for example at their ends remote from the column amplifiers 40, rather than via the amplifiers.

Strips of conductive material may be provided directly on the upper surface of the insulating layer 25 of the device which extend over the spaces between adjacent rows or adjacent columns, or both, of the sense electrodes 33, for example as lines or in a grid pattern, and which are grounded electrically to improve grounding of the individual finger portions. In another modification, a matrix of discrete, electrically conductive pad electrodes may be provided on the surface of the insulating layer, each overlying and corresponding in size and shape to a sense electrode 33, to form the opposite plates of the capacitors 35. Ridges of a fingerprint would then ground particular ones of these pad electrodes where they are in contact and the capacitance of the capacitors 35 is then determined only by the area of the sense electrodes 33 and their opposing pad electrodes and the thickness of the intervening insulating layer 25 so that substantially identical, and more distinctive, capacitances are obtained at all ridge contact locations. Elsewhere, surface portions of the finger are spaced from their underlying pad electrodes and the capacitance values are dependent on this spacing as before.

Various modifications to the above-described embodiments are possible. For example, although diodes comprising pin devices are preferable, other kinds of diodes, such as pn or Schottky diodes, could be used. It is conceivable that diode connected TFTs, in which the gate and source terminals of a TFT are interconnected, could also be utilised.

Figure 7A:
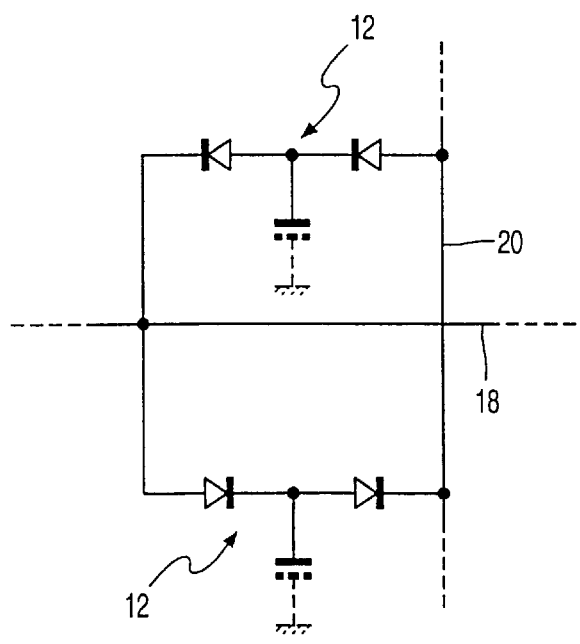
FIGS. 7A and 7B show schematically the arrangements of two typical sense elements in two further embodiments of the sensing device.

It will be appreciated that the directions of the two diodes 30 and 31 in a sense element could be reversed with the polarity of the drive signals employed inverted so that negative and positive signals are then applied to the row conductors and column conductors respectively rather than the positive and negative signals described previously. Using this principle, it is also possible to reduce the number of address conductors required. FIG. 7A illustrates one possible alternative sense element lay-out which results in the number of row conductors needed being halved. In this Figure two adjacent sense elements 12 from the same column are shown connected to the same row conductor 18 and the same column conductor 20. The direction of the diodes in one sense element is opposite to that of the diodes in the other sense element. Using this approach, two adjacent rows of sense elements share the same row conductor 18. The array is driven by applying firstly positive selection pulse signals, as in the previously-described embodiments, to the row conductors in sequence so as to address even number rows of sense elements in the array in turn and then applying negative selection pulse signals to the row conductors, in sequence, so as to address all the odd number rows of sense elements. Alternatively, the polarity of the drive signals could be inverted after addressing each row so that all rows in the array are addressed one after the other in sequence.

Figure 7B:
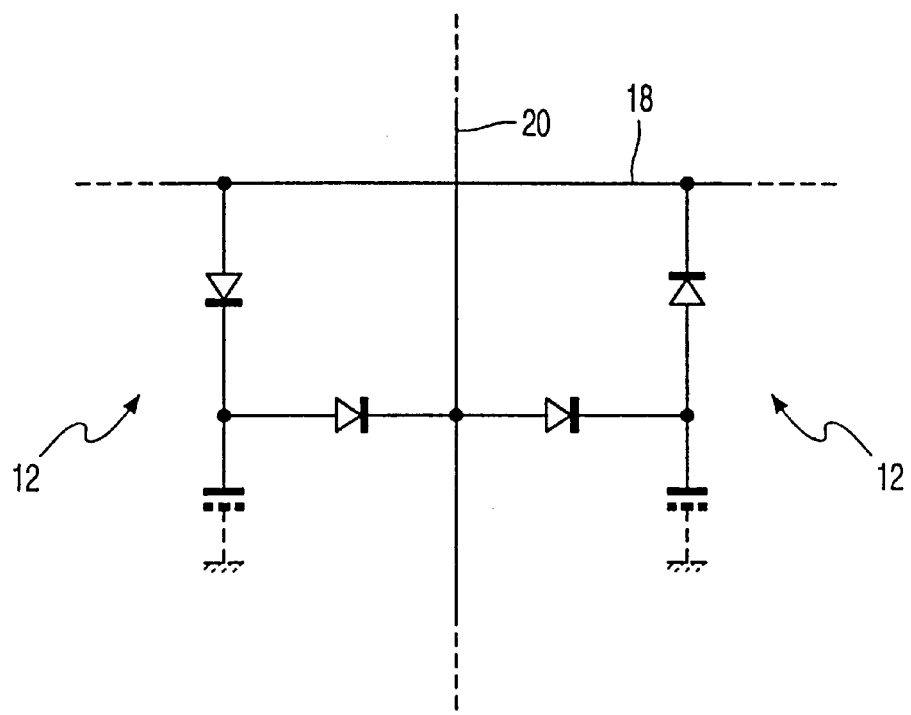

FIG. 7B illustrates another possible sense element lay-out which results in the number of column conductor required being halved. In this case, adjacent sense elements 12 in two columns share the same row and column conductors 18 and 20 which are again addressed by applying respectively a positive selection signal and a negative selection signal to the row conductor 18. The sense elements in all even columns may be addressed and read out firstly followed then by the sense elements in the odd columns.

In summary, therefore, a fingerprint sensing device is provided comprising an array of sense elements which each include a sense electrode, providing in combination with an overlying fingerprint part a capacitance, and first and second diode devices connected respectively between the sense electrode and associated ones of first and second sets (e.g. row and column) address conductors. An address circuit connected to the address conductors biases the diode devices in a respective address period such that a potential is applied via the first address conductor and the first diode device to the sense electrode and thereafter stored charge, indicative of the capacitance, is transferred via the second diode device to the second address conductor. The device offers fast, reliable, scanning and can conveniently be implemented using thin film technology for low cost and compactness.

Figure 8:
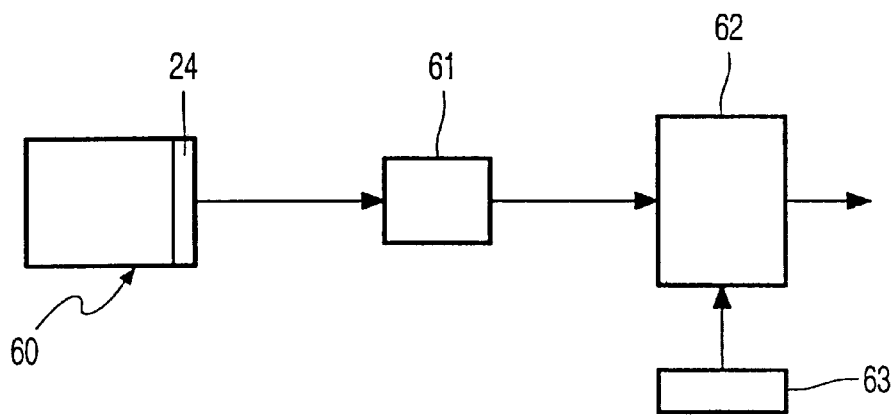
FIG. 8 illustrates in simple block diagram form a fingerprint recognition system using the sensing device.

FIG. 8 shows in schematic block form a fingerprint recognition system incorporating the sensing device, here represented by the block 60. The system includes means responsive to an output from the sensing circuit of the device to provide characteristical data of a sensed fingerprint, and means for comparing said characteristical data with stored characteristical data for one or more fingerprints. The output obtained from the sensing device is provided in a form comparable to the video output provided by an image sensor in known optical fingerprint sensing devices. Accordingly, and as will be apparent to skilled persons, components of the system, other than the sensing device, can be generally of the kind employed in systems using optical sensing devices. The characteristical data, in accordance with standard practice, may take the form of information regarding the orientation of ridge lines and relative positions of minutiae, that is the ending and bifurcations of the lines. The processing of information obtained from the sensing device to produce and compare characteristical data can follow known schemes and techniques. Because the sensing device of the invention is capable of providing information of the three dimensional profile of a fingerprint improved accuracy of identification or verification can be obtained by making use of topological features in addition to the spatial positions of minutiae, although of course use may be made only of information in respect of the two-dimensional ridge patterns to simplify the processing necessary if less accuracy is acceptable. Briefly, the output from the device 60, suitably conditioned, is fed to an analysis circuit 61 which is programmed to detect characterising features of the fingerprint sensed such as the position of minutiae. Data from the circuit 61 is supplied to a computer 62 which through standard algorithms compares the data with characteristical data of a plurality of fingerprints, or a single fingerprint depending on whether the system is used for identification or merely verification purposes, held in a storage device 63 and which provides an output in accordance with whether or not a match has been found.

The circuit 61 can be programmed either to utilise the three dimensional information provided by the sensing device for high accuracy of recognition, or alternatively, with appropriate discrimination to select particular output signal values from the device 60, utilising specific information representative of the two dimensional ridge pattern in the nature of a binary image similar to that obtained from known optical sensing devices.

From reading the present disclosure, other modifications will be apparent to persons skilled in the art. Such modifications may involve other features which are already known in the field of fingerprint sensing and component parts thereof and which may be used instead of or in addition to features already described herein.

What is claimed is:

1. A fingerprint sensing device comprising an array of capacitive sense elements which each include a sense electrode for providing, in combination with an individual portion of an overlying finger, a capacitance, said individual portion comprising a plate of said capacitance, and addressing means connected to the sense elements through first and second sets of address conductors for addressing the sense elements and providing outputs indicative of the capacitances of the sense elements, characterised in that each sense element has a first diode device connected between an address conductor of the first set and the sense electrode through which an electrical potential supplied to the address conductor by the addressing means is applied to the sense electrode and a second diode device connected between the sense electrode and an address conductor of the second set through which a charge stored via the capacitance of the sense element is fed to the address conductor of the second set.

2. A fingerprint sensing device according to claim 1, characterised in that the addressing means is arranged to render the two diode devices of a sense element conductive in succession during an address period for the sense element so as to apply in a first part of the address period the potential to the sense electrode via the first diode device and to transfer a charge stored on the capacitance in a subsequent part of the address period to the address conductor of the second set via the second diode device.

3. A fingerprint sensing device according to claim 2, characterised in that the addressing means is arranged to reverse bias the second diode device of the sense element via the address conductor of the second set at the end of the address period so as to isolate the sense element capacitance from the address conductor of the second set.

4. A fingerprint sensing device according to claim 2, characterised in that the first and second sets of address conductors comprise sets of row and column address conductors respectively and in that the sense elements are arranged in rows and columns with the first diode devices of each sense element in a row being connected to an associated one of the row address conductors and the second diode devices of each sense element in a column being connected to an associated column address conductor.

5. A fingerprint sensing device according to claim 4, characterized in that adjacent pairs of rows of sense elements are connected to the same row address conductor with the direction of the diode devices of the sense elements in one of the rows being opposite to the direction of the diode devices of the sense elements in the other row.

6. A fingerprint sensing device according to claim 4, characterised in that adjacent pairs of columns of sense elements are connected to the same column address conductor with the direction of the diode devices of the sense elements in one of the columns being opposite to the direction of the diode devices of the sense elements in the other column.

7. A fingerprint sensing device according to claim 1, characterised in that the addressing means is arranged to render the first and second diode devices of a sense element conductive at the same time during a first part of an address period for the sense element so as to set the voltage at the sense electrode to a predetermined level and in a latter part of the address period to turn off the first diode device so that a charge stored on the capacitance is transferred to the address conductor of the second set via the second diode device.

8. A fingerprint sensing device according to claim 7, characterised in that the first and second sets of address conductors comprise sets of row and column address conductors respectively and in that the sense elements are arranged in rows and columns with the first diode devices of each sense element in a row being connected to an associated one of the row address conductors and the second diode devices of each sense element in a column being connected to an associated column address conductor.

9. A fingerprint sensing device according to claim 8, characterized in that the addressing means is arranged to address each row of sense elements in turn in a respective address period by applying a selection signal to a row address conductor in an initial part of the address period which renders at least the first diode devices of the two diode devices in the sense elements of that row conductive.

10. A fingerprint sensing device according to claim 9, characterized in that adjacent pairs of rows of sense elements are connected to the same row address conductor with the direction of the diode devices of the sense elements in one of the rows being opposite to the direction of the diode devices of the sense elements in the other row.

11. A fingerprint sensing device according to claim 9, characterised in that adjacent pairs of columns of sense elements are connected to the same column address conductor with the direction of the diode devices of the sense elements in one of the columns being opposite to the direction of the diode devices of the sense elements in the other column.

12. A fingerprint sensing device according to claim 1, characterised in that the first and second sets of address conductors comprise sets of row and column address conductors respectively and in that the sense elements are arranged in rows and columns with the first diode devices of each sense element in a row being connected to an associated one of the row address conductors and the second diode devices of each sense element in a column being connected to an associated column address conductor.

13. A fingerprint sensing device according to claim 12, characterised in that the addressing means is arranged to address each row of sense elements in turn in a respective address period by applying a selection signal to a row address conductor in an initial part of the address period which renders at least the first diode devices of the two diode devices in the sense elements of that row conductive.

14. A fingerprint sensing device according to claim 13, characterized in that adjacent pairs of rows of sense elements are connected to the same row address conductor with the direction of the diode devices of the sense elements in one of the rows being opposite to the direction of the diode devices of the sense elements in the other row.

15. A fingerprint sensing device according to claim 13, characterised in that adjacent pairs of columns of sense elements are connected to the same column address conductor with the direction of the diode devices of the sense elements in one of the columns being opposite to the direction of the diode devices of the sense elements in the other column.

16. A fingerprint sensing device according to claim 12, characterised in that adjacent pairs of rows of sense elements are connected to the same row address conductor with the direction of the diode devices of the sense elements in one of the rows being opposite to the direction of the diode devices of the sense elements in the other row.

17. A fingerprint sensing device according to claim 12, characterised in that adjacent pairs of columns of sense elements are connected to the same column address conductor with the direction of the diode devices of the sense elements in one of the columns being opposite to the direction of the diode devices of the sense elements in the other column.

18. A fingerprint sensing device according to claim 1, characterised in that the first and second sets of address conductors, and the sense electrodes and the diode devices of the sense elements of the array comprise thin film structures carried on a common insulating substrate.

19. A fingerprint sensing device according to claim 18, characterised in that the diode devices of the sense elements comprise p-i-n diodes.

20. A fingerprint recognition system comprising a fingerprint sensing device in accordance with claim 1, means responsive to the outputs provided by the addressing means indicative of the capacitances of the sense elements to provide characterised data of a sensed fingerprint and means for comparing said characterised data with stored characteristical data for one or more fingerprints.

* * * * *